United States Patent
Edwards et al.

(10) Patent No.: US 9,311,645 B2
(45) Date of Patent: Apr. 12, 2016

(54) TECHNIQUES FOR CHECKOUT SECURITY USING VIDEO SURVEILLANCE

(75) Inventors: Thomas V. Edwards, Suwanee, GA (US); Ganesh Bandaru, Cumming, GA (US)

(73) Assignee: NCR Corporation, Duluth, GA (US)

( * ) Notice: Subject to any disclaimer, the term of this patent is extended or adjusted under 35 U.S.C. 154(b) by 733 days.

(21) Appl. No.: 13/600,913

(22) Filed: Aug. 31, 2012

(65) Prior Publication Data

US 2014/0063262 A1    Mar. 6, 2014

(51) Int. Cl.
H04N 7/18       (2006.01)
G06Q 30/00      (2012.01)
G06Q 20/40      (2012.01)
G07G 1/00       (2006.01)
G06Q 20/20      (2012.01)

(52) U.S. Cl.
CPC ............ G06Q 30/018 (2013.01); G06Q 20/20 (2013.01); G06Q 20/4016 (2013.01); G07G 1/0054 (2013.01)

(58) Field of Classification Search
CPC .......... G06Q 30/02; G06K 2017/0045; H04N 7/183; G08B 13/2462; G08B 13/14; G08B 13/19613
USPC ......... 348/150, 159; 705/14.26, 14.25, 14.37, 705/14.38, 16, 22, 18, 26.1; 235/383; 340/568.5, 568.1
See application file for complete search history.

(56) References Cited

U.S. PATENT DOCUMENTS

| | | | |
|---|---|---|---|
| 5,877,485 A | 3/1999 | Swartz | |
| 5,965,861 A * | 10/1999 | Addy et al. | 235/383 |
| 6,092,725 A | 7/2000 | Swartz et al. | |
| 7,016,862 B1 * | 3/2006 | Vassigh et al. | 705/17 |
| 7,063,263 B2 | 6/2006 | Swartz et al. | |
| 7,797,232 B2 * | 9/2010 | Kuroda et al. | 705/38 |
| 7,932,923 B2 * | 4/2011 | Lipton | G06F 17/3079 348/143 |
| 7,974,869 B1 * | 7/2011 | Sharma et al. | 705/7.31 |
| 8,457,354 B1 * | 6/2013 | Kolar et al. | 382/103 |
| 8,610,766 B2 * | 12/2013 | Ding et al. | 348/77 |
| 8,665,333 B1 * | 3/2014 | Sharma et al. | 348/159 |
| 2002/0167408 A1 * | 11/2002 | Trajkovic | G06Q 30/06 340/573.1 |
| 2003/0098910 A1 * | 5/2003 | Kim | 348/150 |
| 2003/0197782 A1 * | 10/2003 | Ashe et al. | 348/150 |
| 2004/0111324 A1 * | 6/2004 | Kim | 705/22 |
| 2005/0012613 A1 * | 1/2005 | Eckstein et al. | 340/539.13 |
| 2005/0169367 A1 * | 8/2005 | Venetianer et al. | 375/240.01 |
| 2006/0010027 A1 * | 1/2006 | Redman | G06Q 10/063116 705/7.16 |
| 2006/0243798 A1 * | 11/2006 | Kundu et al. | 235/383 |
| 2007/0194112 A1 * | 8/2007 | Petroskey | 235/383 |
| 2007/0279214 A1 * | 12/2007 | Buehler | G08B 13/19615 340/521 |
| 2008/0005036 A1 * | 1/2008 | Morris | 705/64 |
| 2008/0018738 A1 * | 1/2008 | Lipton | G06K 9/00771 348/143 |
| 2008/0218591 A1 * | 9/2008 | Heier et al. | 348/150 |
| 2008/0249859 A1 * | 10/2008 | Angell et al. | 705/14 |
| 2008/0255898 A1 * | 10/2008 | Kuroda et al. | 705/7 |
| 2010/0013931 A1 * | 1/2010 | Golan et al. | 348/150 |
| 2010/0026802 A1 * | 2/2010 | Titus et al. | 348/143 |
| 2011/0191195 A1 * | 8/2011 | Lipton et al. | 705/16 |

(Continued)

Primary Examiner — Victor Kostak
(74) Attorney, Agent, or Firm — Schwegman, Lundberg & Woessner

(57) ABSTRACT

Techniques for checkout security using video surveillance are provided. A customer is video tracked while in a store, the pauses made in aisles and the arm movements are recorded. Expected purchased items, based on movements and pauses by the customer within the store, are then compared to actual purchased items and a determination is made whether a checkout audit is needed for the customer.

20 Claims, 4 Drawing Sheets

(56) References Cited

U.S. PATENT DOCUMENTS

2012/0169879 A1* 7/2012 Libal et al. .................... 348/150
2012/0320214 A1* 12/2012 Kundu et al. ................. 348/150
2013/0266181 A1* 10/2013 Brewer .............. G06K 9/00302
382/103

* cited by examiner

TECHNIQUES FOR CHECKOUT SECURITY USING VIDEO SURVEILLANCE

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like.

Traditional self-checkout systems employ item level security through weight, dimensions, colors, etc. While not completely effective, the net effect is that shoppers are inclined to scan and then bag each item progressing through the cart until all items are entered into the transaction.

Recent advances in handheld technology, notably mobile devices, have introduced new challenges for retailers to implement adequate forms of security while the shopper controls scanning of items in the aisle and makes payment either at a self-service lane, assisted lane, or fully from the mobile device using eWallet technologies (e.g. PayPal®, etc.).

Transaction audits are thought to be effective in preventing theft with in-aisle scanning systems. The audit strategy is commonly based on a combination of shopping and audit history, together with various probability models. When an audit is indicated, it can be either partial or full. A partial audit verifies that certain items selected randomly from the cart are in fact entered into the transaction. Other strategies, such as ones based on selecting the items by value are also common.

A full audit has the attendant re-itemize the entire transaction, which is then compared to the in-aisle version of the transaction to identify attempted theft.

While effective, the audit is highly disruptive to the checkout activity often slowing throughput during peak store hours as Attendants have multiple audits queued up. This greatly frustrates shoppers as well, because they are delayed from finalizing the transaction for seemingly no reason at all (from the perspective of the shoppers).

SUMMARY

In various embodiments, techniques for achieving checkout security using in-store video surveillance are presented. According to an embodiment, a method for determining a checkout audit is provided.

Specifically, in-store tracking information for a shopper is received. Aspects of the in-store tracking information are correlated with known products of a store. Next, purchased items are compared against expected items when the shopper checks out of the store. Finally, a decision is made as to whether to audit the shopper before the shopper exits the store.

DETAILED DESCRIPTION

Figure 1:
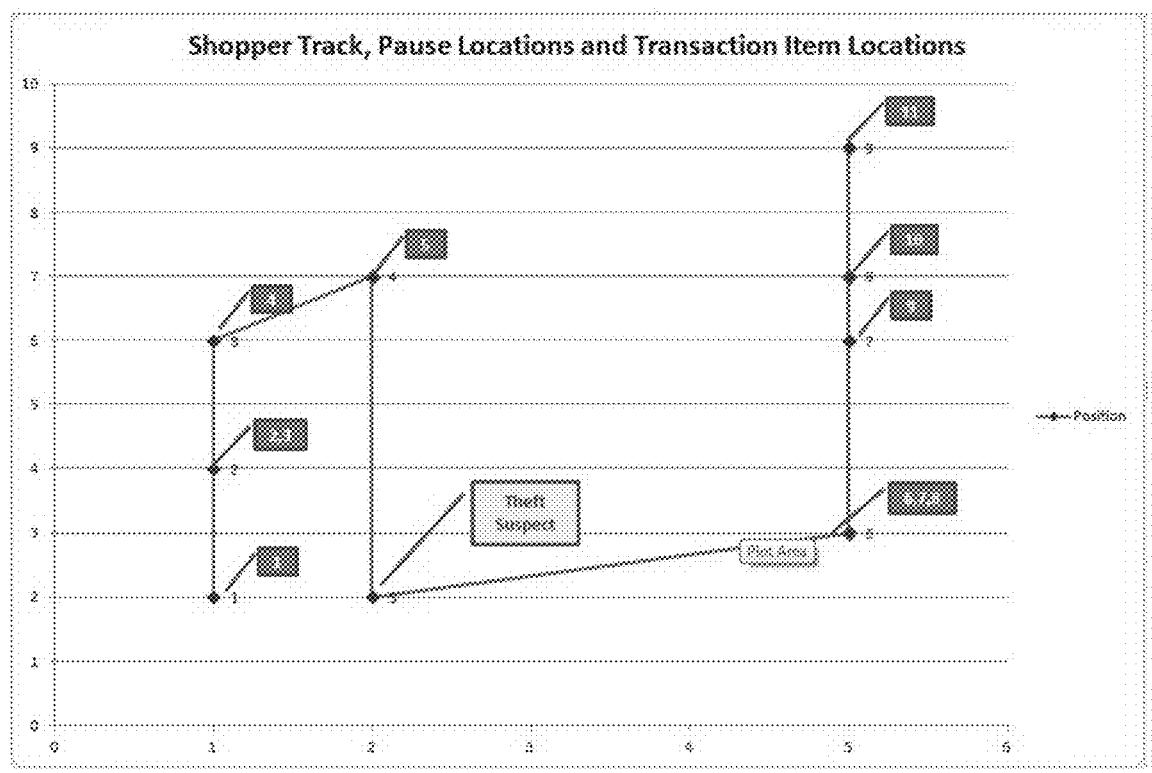
FIG. 1 is a diagram of a chart formed to monitor a customer for purposes of determining whether a checkout audit is need with that customer, according to an example situation.

FIG. 1 is a diagram of a chart formed to monitor a customer for purposes of determining whether a checkout audit is need with that customer, according to an example situation. It is noted that the chart of the FIG. 1 shows but one example with some data points and is presented for purposes of illustration.

The techniques presented herein accept that the audit is a deterrent to theft and seek to optimize the trigger of audits to only those transactions that exhibit characteristics consistent with theft. Specifically, the location of the shopper is tracked and recorded as he/she traverses the store aisles using standard people tracking algorithms or products. The resultant track provides information on what aisles the shopper visited, his/her velocity, or more importantly where he/she paused in the aisle and for how long.

When the in-aisle shopper then goes to tender (via mobile device or payment station such as self-checkout or assisted lane) the item list from the shopper's in-aisle scanning activity is correlated against the transaction eReceipt (electronic receipt) and a probability of theft metric is generated that is then compared against a threshold to trigger the transaction audit (at the self-checkout or at the door (continuing the people tracking) for mobile tender).

The theft probability is determined by examining where in the store the shopper paused his/her travel long enough to select an item. The detection of a "pause" must consider that sometimes shoppers are blocked because of cart traffic or other temporary obstacles. The people tracking system is smart enough and calibrated to differentiate these secondary causes from pausing to pick item(s) off the shelf and placing them into a cart or hand basket.

Assuming now we have the shopper's track information and the transaction item list and knowledge of where in the store each item is located, we can now test the location where each pause in movement occurred with the items on the receipt that could have been picked at that place. After all items are matched to pauses (corresponding to picking that item from its shelf location), any unmatched pauses (with no matching transaction item) are suspects for theft. The theft being the picking of an item and placing it in the cart but not scanning it into the final checkout transaction.

In order to perform this correlation, the shopper's track information is bound to the particular transaction of that shopper, where ever it occurs. There are a number of ways this can be done assuming that we have supplied the base mobile application using in-aisle for scanning. The least intrusive approach is to perform a correlation between all the completed tracks and the transaction item list when tender is requested. The correlation then becomes a match of the item location profiles with the scan times, matched against the shopper track information. This should be completely effective for large transactions >5 items because the correlation length is sufficient to eliminate ambiguity.

The people tracking system can also be leveraged to monitor the travel of a shopper to a specific lane or other checkout point, further reducing the ambiguity.

In the FIG. 1, the x axis represents aisles and the y axis the position down the aisle; essentially a grid floor plan of the store. The track is shown in solid lines and pauses with diamond symbols along the track. (The actual track would extend to the ends of the aisles). In this example case, 11 items are in the transaction and they have been mapped by time stamp and an in-store product location database to correspond to the places in the store where the shopper paused. No items on the transaction are available at the site of pause 5 leading one to suspect that a theft might have occurred at this point.

Advanced video processing can be further exploited to monitor the actions of the shopper's arms reaching to the shelves to reduce the false alarm rate.

This measure of theft probability can then be combined with other measures such as shopping history, etc. to render a final audit decision.

The proposed techniques can greatly reduce the false alarm rate for in-aisle scanning audits and only request audits when reasonable suspicion that the shopper has un-purchased items.

The techniques are highly effective in recognizing theft of high value meat/seafood products because they are located in physically separate areas from other store items. The ability to detect arm motion (also readily available in today's people tracking technology) greatly reduces the false alarm rate.

One of the hardest issues to prevent is the shopper selecting organic produce but paying only for non-organic equivalents. The locational awareness can readily detect if the shopper paused significantly at the organic vegetable area but is telling the self-checkout system that non-organic vegetables are being purchased.

Figure 2:
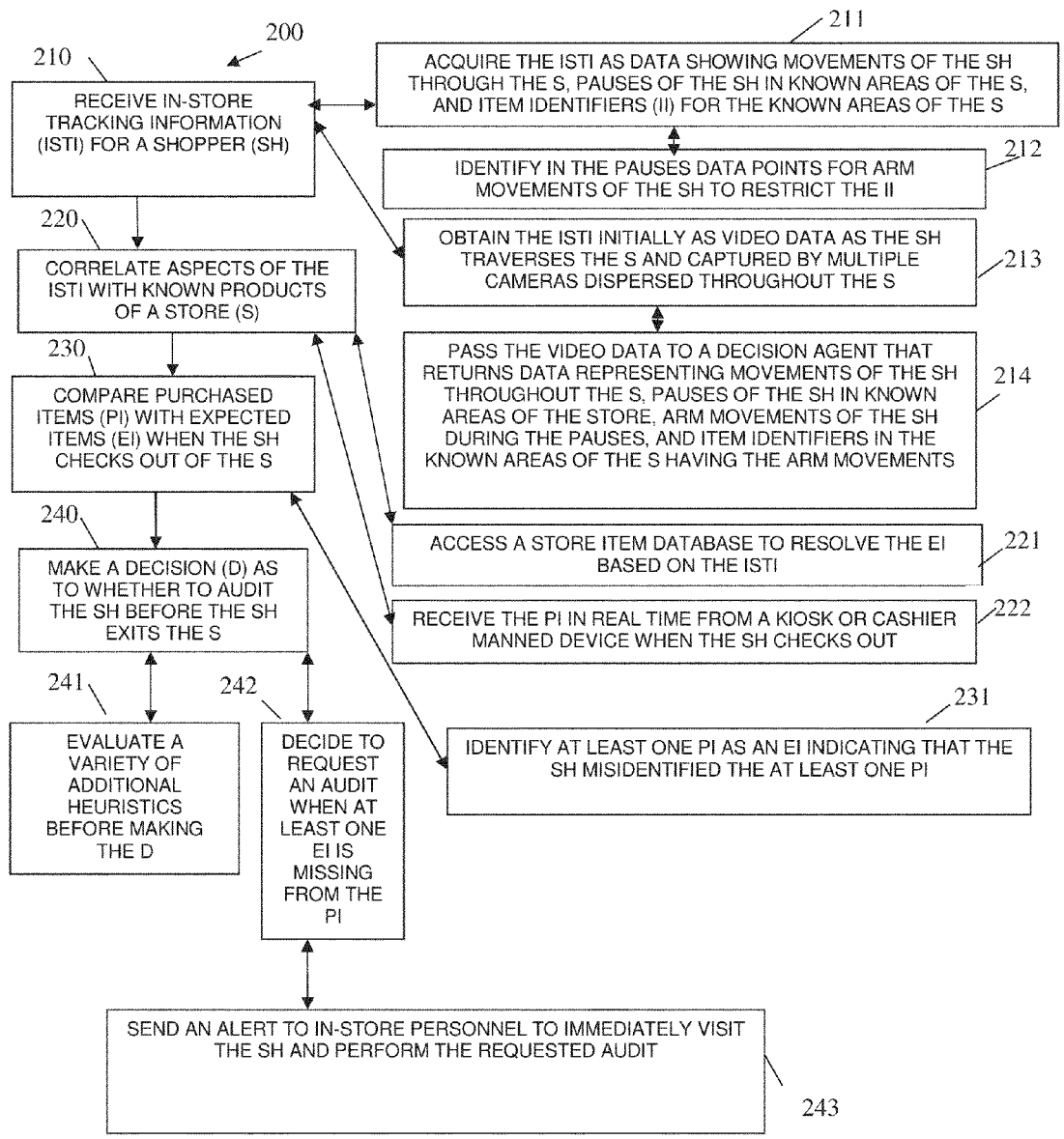
FIG. 2 is a diagram of a method for determining a checkout audit, according to an example embodiment.
Figure 3:
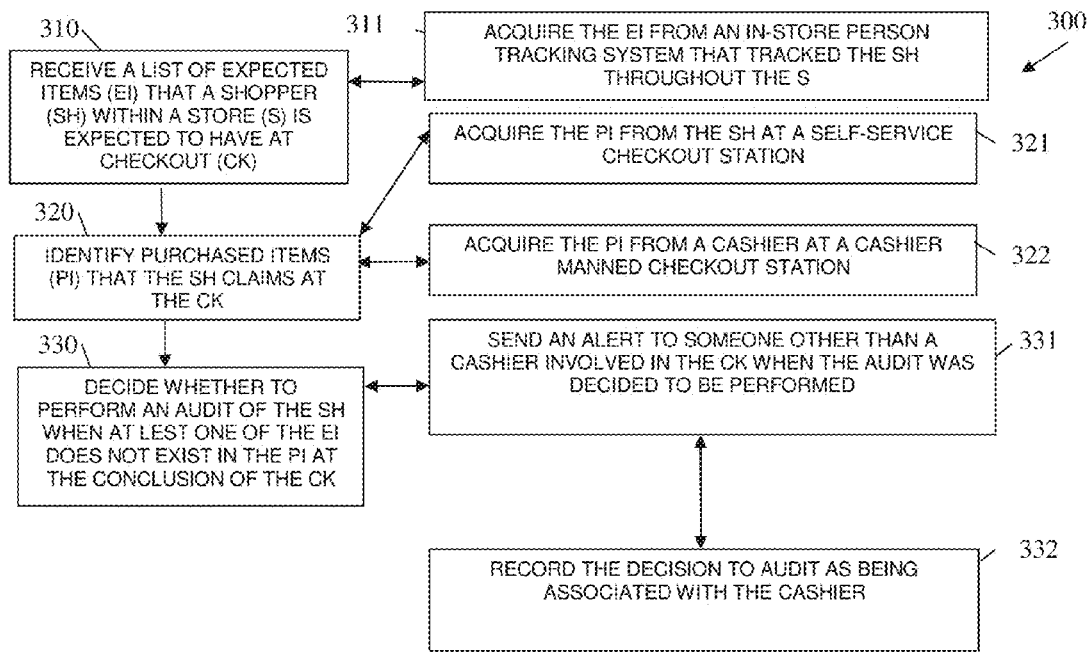
FIG. 3 is a diagram of another method for determining a checkout audit, according to an example embodiment.
Figure 4:
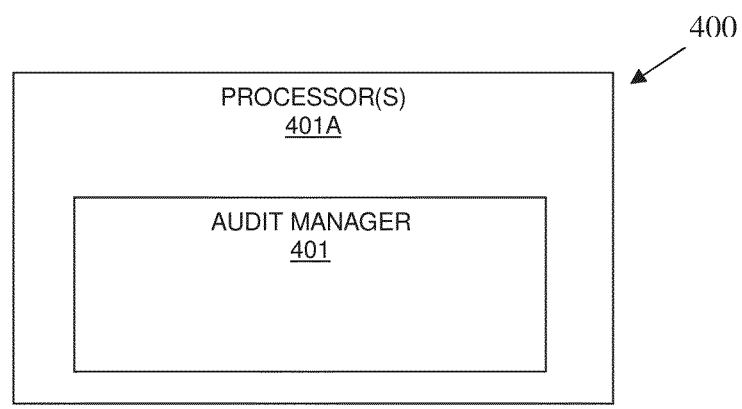
FIG. 4 is a diagram of checkout audit system, according to an example embodiment.

It is now within this context that specific embodiments of the invention are presented with reference to the FIGS. 2-4.

FIG. 2 is a diagram of a method 200 for determining a checkout audit, according to an example embodiment. The method 200 (hereinafter "audit manager") is implemented as instructions programmed and residing on a non-transitory computer-readable (processor-readable) storage medium and executed by one or more processors. The processors are specifically configured and programmed to process the audit manager. The audit manager may also operate over a network. The network is wired, wireless, or a combination of wired and wireless.

The audit manager executes on one or more processors of a kiosk system. A kiosk system includes a variety of devices, such as display, perhaps touch screen, scanner, card swipe device, and cash/coin accepter device. In another case, the audit manager executes on a server within a store that is in communication with the kiosk system. In still another situation, the audit manager executes on a cashier manned station used for checkouts.

At 210, the audit manager receives in-store tracking information for a shopper that is traversing the store. This can be received and can include a variety of information.

According to an embodiment, at 211, the audit manager acquires the in-store tracking information as data showing movements of the shopper throughout the store, pauses of the shopper in known areas of the store, and item identifiers in the known areas of the store for known products of the store. This can be achieved via maps and plot data for the store as discussed above with reference to the FIG. 1.

Continuing with the embodiment of 211 and at 212, the audit manager identifies in the pauses data points for arm movements of the shopper to restrict the item identifiers for the known products. So, when the arm is moved during a pause this is a good indication a product was selected and not a situation during a pause with no arm movement where there is simply a backup in the store that caused the shopper to pause.

In an embodiment, at 213, the audit manager obtains the in-store tracking information initially as video data of the shopper traversing the store and captured by multiple cameras dispersed throughout the store.

Continuing with the embodiment of 213 and at 214, the audit manager passes the video data to a decision agent that returns data representing movements of the shopper through the store, pauses of the shopper in known areas of the store, arm movements of the shopper during those pauses, and item identifiers in the known areas of the store having the arm movements for the known products of the store.

The processing of 211-214 demonstrates that a variety of architectural arrangements can be afforded to process in-store video data some by the audit manager or by other entities of the enterprise (store) or even other third-party services.

At 220, the audit manager correlates aspects of the in-store tracking information with known products of the store. That is, determinations are made as to what the expected items of the shopper should be based on the correlation with the in-store tracking information.

According to an embodiment, at 221, the audit manager accesses a store product database to resolve the expected items based on the in-store tracking information. So, a back-end database can be used to resolve the known products and the expected items.

At 230, the audit manager compares purchased items with expected items when the shopper checks out of the store.

According to an embodiment, at 231, the audit manager receives the purchased items in real time from a kiosk or a cashier manned device when the shopper checks outs.

In another case, at 232, the audit manager identifies at least one purchased item as being a same type as an expected item indicating that the shopper misidentified the at least one purchase item. This may be a situation where an orange was identified but not identified as being organic when in fact it was based on the analysis. So, suppose an item is of a given type (produce) or even a shirt, this situation can detect when the shopper is trying to pass off a different brand for that type of item from what is expected based on the analysis.

At 240, the audit manager makes a decision as to whether to audit the shopper before the shopper exits the store.

In an embodiment, at 241, the audit manager evaluates a variety of additional configured heuristics before making the decision.

In an alternative case, at 242, the audit manager decides to request an audit when at least one expected item is missing from the purchased items.

Continuing with the embodiment of 242 and at 243, the audit manager automatically sends an alert to in-store personnel to immediately visit the shopper and perform the requested audit. In some cases, the audit manager also includes selected extracted images of suspicious events to the store personnel, which allows them to identify the shopper in question, if the shopper is not at a non-movable terminal making payment. The image, if extracted at the point of handling the item in question, can also serve to indicate to the store personnel the particular item of the card to audit, thereby making the audit operation much more efficient than rescanning the entire transaction or otherwise randomly auditing a portion of all the items in the cart.

FIG. 3 is a diagram of another method 300 for determining a checkout audit, according to an example embodiment. The method 300 (hereinafter "audit controller") is implemented as instruction and programmed within a non-transitory computer-readable (processor-readable) storage medium that executes on one or more processors of a kiosk system (e.g., display, perhaps touch screen, card swipe device, a cash/coin accepter device, etc.); the processors of the kiosk system are specifically configured to execute the audit controller. In another case, the audit controller is implemented on a server within a store and is in communication with both kiosk systems and cashier-manned systems. In still other situations, the audit controller is implemented within cashier-manned systems within the store. The audit controller may also be operational over a network; the network is wired, wireless, or a combination of wired and wireless.

The audit controller presents another and in some ways enhanced processing perspective of the audit manager represented by the method 200 and discussed above with reference to the FIG. 2.

At 310, the audit controller receives a list of expected items that a shopper within a store is expected to have at checkout.

According to an embodiment, at 311, the audit controller acquires the expected items from an in-store person tracking system that tracked the shopper throughout the store.

At 320, the audit controller identifies purchased items that the shopper claims at the checkout.

In an embodiment, at 321, the audit controller acquires the purchased items from the shopper at a self-service checkout station.

In an alternative situation, at 322, the audit controller acquires the purchased items from a cashier at a cashier manned checkout station.

At 330, the audit controller decides whether to perform an audit of the shopper when at least one of the expected items does not exist in the purchased items at the conclusion of the checkout.

In an embodiment, at 331, the audit controller sends an alert to someone other than the cashier involved in the checkout when the audit was decided to be performed. This is useful in case the cashier is part of the theft problem, such as when the shopper is a friend of the cashier.

Continuing with the embodiment of 331 and at 332, the audit controller records the decision to audit as being associated with the cashier. So, counts can be automatically performed to be used in cashier performance evaluations.

FIG. 4 is a diagram of checkout audit system 400, according to an example embodiment. The components of the checkout audit system 400 are implemented as executable instructions and programmed within a non-transitory computer-readable (processor-readable) storage medium that execute on one or more processors of a kiosk system (e.g., self-service kiosk and component devices, etc.) or server; the processors of the kiosk system or server are specifically configured to execute the components of the checkout audit system 400. The checkout audit system 400 may also be operational over a network; the network is wired, wireless, or a combination of wired and wireless.

The checkout audit system 400 includes an audit manager 401.

The checkout audit system 400 includes a kiosk system, cashier manned system, or server having one or more processors 401A that execute the audit manager 401, which is implemented, programmed, and resides within a non-transitory computer-readable storage medium. Example processing associated with the audit manager 401 was presented above in detail with reference to the FIGS. 1-3

The audit manager 401 is configured to resolve expected items that a shopper within a store is expected to have and compares those expected items at a checkout for the shopper to determine whether a transaction for the shopper is to be audited. This was explained in great detail above with reference to the FIGS. 1-3.

According to an embodiment, the audit manager 401 is configured to interact with an in-store people tracking system to resolve the expected items.

Continuing with the previous embodiment, the audit manager 401 is further configured to interact with an in-store product database to resolve the expected items as well.

Various embodiments herein have described a real-time detection/analysis of shopper movements within a store based on pauses and arm movements during those pauses to drive audit decisions. An alternative embodiment is foreseen where the declaration of a suspicious event is subjected to further analysis by humans to confirm that the video sample in fact represents moving an item from the shelf into the cart without scanning. The non-real time analysis can be used to update a shopper "trust level" that applies to subsequent visits to the store rather than the current transaction.

In addition, special considerations may be used for handling common shopper activities such as performance for a shopper product nutrition or price comparison. Here, one expects the "arm" events in the same product area to result in a single item scan without affecting the audit probability.

In still another consideration, there can be transactions with multiple humans where one shopper gathers items from the store shelves and brings them to another shopper who scans them or places them in a cart. This can be accounted for as well.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a machine configured to execute the method, comprising:

receiving, at the machine, in-store tracking information for a shopper, wherein receiving further includes identifying with the in-store tracking information aisles visited within a store and how long the shopper pauses at specific locations within specific aisles of the store and factoring into with how long the shopper pauses situations in which the shopper is blocked or encounters obstacles during particular pauses;

correlating, at the machine, aspects of the in-store tracking information with known products of the store;

comparing, at the machine, purchased items with expected items when the shopper checks out of the store; and making, at the machine, a decision as to whether to audit the shopper before the shopper exits the store.

2. The method of claim 1, wherein receiving further includes acquiring the in-store tracking information as data showing movements of the shopper through the store, pauses of the shopper in known areas of the store, and item identifiers in the known areas of the store.

3. The method of claim 2, wherein acquiring further includes identifying in the pauses data points for arm movements of the shopper to restrict the item identifiers.

4. The method of claim 1, wherein receiving further includes obtaining the in-store tracking information initially as video data of the shopper traversing the store and captured by multiple cameras dispersed throughout the store.

5. The method of claim 4, wherein obtaining further includes passing the video data to a decision agent that returns data representing movements of the shopper through the store, pauses of the shopper in known areas of the store, arm movements of the shopper during the pauses, and item identifiers in the known areas of the store having the arm movements.

6. The method of claim 1, wherein correlating further includes accessing a store item database to resolve the expected items based on the in-store tracking information.

7. The method of claim 1, wherein comparing further includes receiving the purchased items in real time from a kiosk or cashier manned device when the shopper checks out.

8. The method of claim 1, wherein comparing further includes identifying at least one purchased item as being of a same type as an expected item indicating that the shopper misidentified the at least one purchased item.

9. The method of claim 1, wherein making further includes evaluating a variety of additional heuristics before making the decision.

10. The method of claim 1, wherein making further includes deciding to request an audit when at least one expected item is missing from the purchased items.

11. The method of claim 10, wherein deciding further includes sending an alert to in-store personnel to immediately visit the shopper and perform the requested audit.

12. A processor-implemented method programmed in a non-transitory processor-readable medium and to execute on one or more processors of a machine configured to execute the method, comprising:

receiving, at the machine, a list of expected items that a shopper within a store is expected to have at a checkout based at least in part on aisles visited by the shopper within the store and how long the shopper pauses at specific locations within specific aisles of the store and factoring into with how long the shopper pauses situations in which the shopper is blocked or encounters obstacles during particular pauses;

identifying, at the machine, purchased items that the shopper claims at the checkout; and deciding, at the machine, whether to perform an audit of the shopper when at least one of the expected items does not exist in the purchased items at the conclusion of the checkout.

13. The method of claim 12, wherein receiving further includes acquiring the expected items from an in-store person tracking system that tracked the shopper throughout the store.

14. The method of claim 12, wherein identifying further includes acquiring the purchased items from the shopper at a self-service checkout station.

15. The method of claim 12, wherein identifying further includes acquiring the purchased items from a cashier at a cashier manned checkout station.

16. The method of claim 12, wherein deciding further includes sending an alert to someone other than a cashier involved in the checkout when the audit was decided to be performed.

17. The method of claim 16 further comprising, recording the decision to audit as being associated with the cashier.

18. A system comprising:

a machine configured with an audit manager that executes on one or more processors of the machine, and the audit manager is implemented and resides in a non-transitory computer-readable storage medium;

wherein the audit manager resolves expected items that a shopper within a store is expected to have based at least in part on how long the shopper pauses at specific locations within specific aisles of the store and factoring into with how long the shopper pauses situations in which the shopper is blocked or encounters obstacles during particular pauses and the audit manager compares those expected items against actual purchased items at a checkout for the shopper to determine whether a transaction for the shopper is to be audited.

19. The system of claim 18, wherein the audit manager is configured to interact with an in-store people tracking system to resolve the expected items.

20. The system of claim 19, wherein the audit manager is configured to interact with an in-store product database to resolve the expected items.

* * * * *